United States Patent [19]

Kotzur et al.

[11] 4,447,063
[45] May 8, 1984

[54] SHAFT SEAL WITH POSITIVELY MAGNETICALLY CONTROLLED SEALING GAP

[75] Inventors: Joachim Kotzur, Oberhausen; Hans H. Reinersmann, Essen; Rolf Albers, Oberhausen; Emil Aschenbruck, Duisburg; Günter Neuhaus, Oberhausen, all of Fed. Rep. of Germany

[73] Assignee: M.A.N. Maschinenfabrik Augsburg-Nürnberg A.G., Fed. Rep. of Germany

[21] Appl. No.: 500,160

[22] Filed: Jun. 1, 1983

[30] Foreign Application Priority Data

Jun. 5, 1982 [DE] Fed. Rep. of Germany ....... 3221380
Jul. 24, 1982 [DE] Fed. Rep. of Germany ....... 3227796

[51] Int. Cl.³ .............................................. F16J 15/54
[52] U.S. Cl. ..................................... 277/80; 277/26; 277/38; 277/81 R; 277/901; 277/28
[58] Field of Search .................................. 277/1, 38–41, 277/26, 28, 29, 65, 80, 81 R, 83, 173–177, 901

[56] References Cited

U.S. PATENT DOCUMENTS

| 3,025,070 | 3/1962 | Copes | 277/80 X |
| 3,170,409 | 2/1965 | McLeod et al. | 277/80 X |
| 3,708,177 | 1/1973 | Baermann | 277/80 |

FOREIGN PATENT DOCUMENTS

| 141821 | 4/1920 | United Kingdom | 277/80 |
| 222085 | 10/1968 | U.S.S.R. | 277/80 |
| 773350 | 10/1980 | U.S.S.R. | 277/80 |
| 887856 | 12/1981 | U.S.S.R. | 277/80 |

*Primary Examiner*—Robert S. Ward
*Attorney, Agent, or Firm*—McGlew and Tuttle

[57] ABSTRACT

In a shaft seal having a radial plane seal ring gap and comprising a seal ring rotating with a shaft, and a non-rotating seal ring mounted on a housing of the seal through an element which is elastically yielding in every direction and serves as a packing at the same time, the sealing fluid flows into the sealing gap through supply bores and through associated distributing pockets which are provided in the non-rotating seal ring and/or at the outer or inner circumference of the rotating seal ring. Sensors for measuring the sealing gap are provided in the non-rotating seal ring on the gap side. By means of the measured values, electromagnets disposed in the seal housing to face each other and cooperating with opposite magnetizable bodies provided in the non-rotating seal ring, are electronically controlled to maintain a predetermined constant small width of the seal gap. The electromagnets are disposed axially at both sides of a shoulder portion of the non-rotating seal ring to be effective in opposite directions, against each other.

12 Claims, 5 Drawing Figures

SHAFT SEAL WITH POSITIVELY MAGNETICALLY CONTROLLED SEALING GAP

FIELD AND BACKGROUND OF THE INVENTION

The present invention relates in general to shaft seals, and in particular to a new and useful device for magnetically controlling a sealing gap in a shaft seal.

Shaft seals are known which provide substantial reduction in the supply of sealing fluid flowing along a wall by which two parts are separated from each other and which is needed for sealing a rotating part against a non-rotating one (German OS No. 21 34 964). The non-rotating seal ring is freely movable in every direction relative to the non-rotating part and is connected thereto by one or more deformable, leakproof walls.

What is disadvantageous in this design is that upon a clogging of the narrow supply bores, the resetting force may be nullified and the rotating ring might brush against the stationary ring.

To eliminate these drawbacks, German OS No. 24 44 544 teaches to direct the sealing gas into the sealing gap through spiral grooves which are provided either in the rotating or in the non-rotating seal ring, from the outside inwardly, considered in the radial direction, whereby gas-dynamic resetting forces are produced. The disadvantage of this design is that the resetting forces depend on the rotational speed and that at low speeds, an additional static gas cushion produced through throttling bores must be provided.

To reduce working fluid leakage in turbo machines, German OS 25 15 316 seaks to keep the shaft seal in concentric position relative to the shaft by means of an electronically controlled magnetic field produced by solenoids. Nothing is disclosed about a design as a radial gap seal in connection with the concentric position relative to the shaft.

Another idea is suggested in German OS No. 16 75 354, namely of adjusting the sealing gap by utilizing the repulsive force of permanent magnets embedded in the seal ring between the throttling bores. However, no details of such a design are given.

The prior art constructions are not suitable for extremely narrow sealing gaps in radial shaft seals which, in addition to the sealing fluid, are exposed to elastic resetting forces acting on the non-rotating seal ring, since with a superimposition of the forces acting axially on the seal gap, the needed uniformity of the gap is not ensured and the ring rotating with the shaft may come into contact with the non-rotating ring.

SUMMARY OF THE INVENTION

The present invention is directed to a design wherein the forces under which the radial sealing gap is formed, are brought into a relation ensuring a permanent correct function of the shaft seal.

Accordingly, an object of the present invention is to provide a seal device for a shaft rotating with respect to a housing, comprising, a rotatable sealing ring connected to and co-rotating with the shaft, a non-rotating seal ring, non-rotatably associated with the housing and defining a radial plane sealing gap with the rotating seal ring, and a packing element which is elastically yielding in all directions connected between the housing and the non-rotating seal ring for permitting relative motion therebetween to vary a width of said radial plane sealing gap and for exerting a resetting force on the non-rotating seal ring. Sealing fluid means are provided for supplying a sealing fluid to the gap under a supply pressure to exert a fluid force between the rotating and non-rotating seal ring, the sealing fluid means acting over at least one supply bore communicating with the gap. One of the rotating and non-rotating seal rings include a pocket or recess into which the bore opens for distributing the fluid. The non-rotating seal ring has a radially extending shoulder extending into an annular recess of the housing, which shoulder includes a magnetically attractable materai. An electromagnet is provided in the annular recess on each axial side of the shoulder for exerting a magnetic force on the magnetically attractable material. At least one sensor is connected to the non-rotatable sealing ring adjacent the gap for sensing the width of the gap. The sensor is connected over control means to the electromagnets for applying a selected magnetic force which counteracts or cooperates with the fluid force and the resetting force to establish a selected gap width.

The other forces axially acting on the non-rotating seal ring are produced by the sealing fluid and the elastic packing element by which the non-rotating seal ring is connected to the housing of the seal.

Now, by supplying and discharging the sealing fluid through pockets, or over the edge of the seal rings through spiral supply grooves, for example, a redundancy over the magnetic system may be obtained in provisions for maintaining the gap. This, however, is not sufficient in itself. In addition, a redundancy in the magnetic system may be obtained by providing electronic control devices in a plurality of parallel arrangements.

Another safety against a brushing contact of the rotating seal ring may be to provide that upon a failure of the electronic system, the universally yielding packing element exerts on the non-rotating seal ring a pull directed away from the rotating seal ring.

In normal instances, the non-rotating seal ring is held radially in its position by the elastically yielding packing element. In particular instances, however, it may be advisable to provide an additional radial guidance. For this purpose, an aerostatic or hydrostatic bearing may be provided at the circumference of the non-rotating seal ring. Alternatively, electromagnets and opposite magnetizable bodies might be mounted at the circumference of the non-rotating seal ring, as means for the radial guidance.

It is further possible to provide a pressure graduation in the shaft seal, or two different sealing fluids. To this end, a plurality of sealing gaps may be provided at the rotating seal ring, for example one at each front side of the ring, each bounded at the other side by the non-rotating seal ring system of the above mentioned design.

In the non-rotating seal ring, in the zone of the sealing gap, temperature sensors may be provided in addition, and the temperature measured therewith may be used for forming a gradient of temperatures in time, serving to actuate the electromagnets through an electronic control to adjust the sealing gap to a predetermined desired width, which is to be kept constant. At least three temperature sensors may be provided along the circumference of the non-rotating seal ring.

Due to this last mentioned provision, the temperature occurring in the zone of the sealing gap is introduced as an additional parameter into the electronic and magnetic control of the sealing gap width, so that an optimum adjustment to the specific operating connections is obtained and the reliability of the shaft seal is substantially increased.

The inventive shaft seal has the advantage that due to the superposition of the different forces acting on the non-rotating seal ring, a brushing contact of the rotating ring is securely prevented. At the same time, even upon a failure of the sealing gas or sealing liquid supply, the predetermined width of the sealing gap is maintained by the control through electomagnetic forces. Conversely, if the electrical control fails, the elastically yielding packing element pulls the non-rotating seal ring away from the rotating seal ring.

Since only a small power is needed for energizing the magnets, the magnetic system may also be used for securing the gap during periods where no sealing fluid is supplied, for example during transportation or assemblage.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, some embodiments of the invention are explained in more detail with refernce to the drawings in which.

DESCRIPTION OF THE PREFERRED EMBODIMENTS

Figure 1:
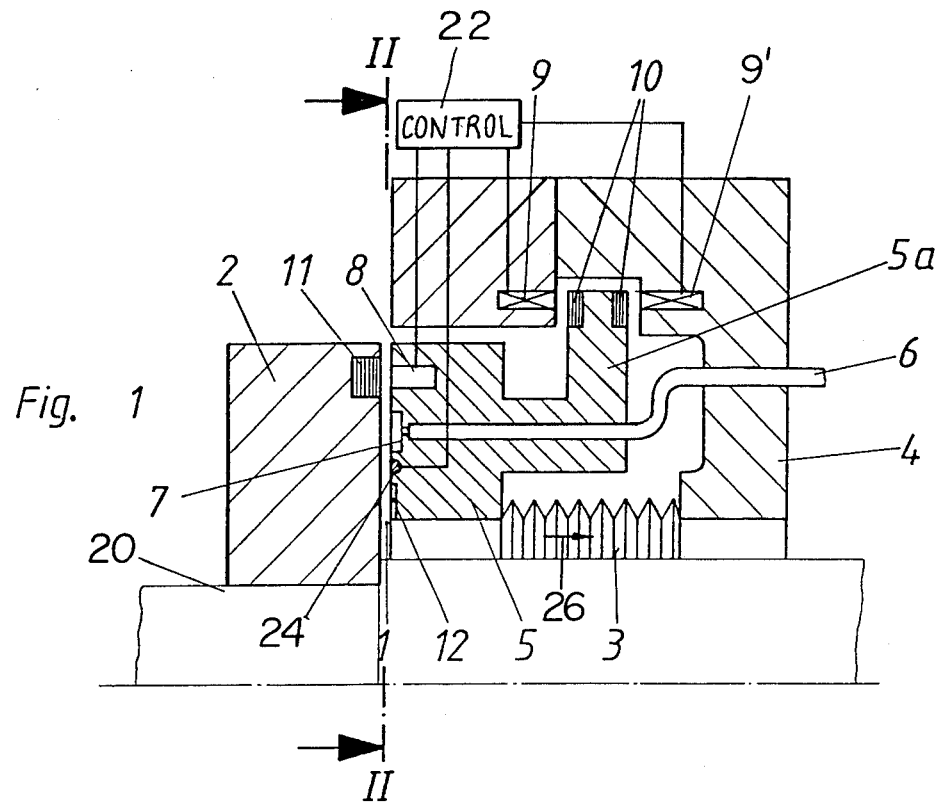
FIG. 1 is a sectional view of a shaft seal.

The figures show a sealing gap 1 bounded by a seal ring 2 which rotates with a shaft 20 and a non-rotating seal ring 5.

Non-rotating sealing ring 5 is connected to a housing 4 of the seal through a packing element 3 which is elastically yielding. This element 3, for example a bellows, exerts an axial force on non-rotating seal ring 5.

Figure 2:
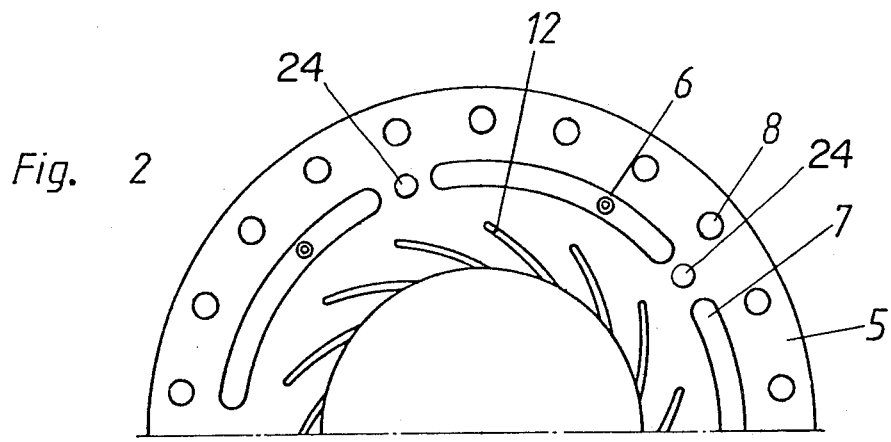
FIG. 2 is a front view taken along the line II—II of FIG. 1.

As shown in FIGS. 1 and 2, sealing fluid is supplied through supply conduits or bores 6 terminating in nozzle-like constricted orifices which open into distributing pockets or recesses 7 provided in non-rotating seal ring 5. The sealing fluid thus flows into sealing gap 1. At high speeds, a dynamic pressure cushion of sealing fluid is formed in addition in spirally extending grooves 12 which, in the present example, are provided at the inner circumferential edge of the non-rotating seal ring 5.

Electromagnets 9 and 9' mounted in seal housing 4 are electronically controlled by means of sensors 8 provided in non-rotating seal ring 5. Sensors 8 act with inserts 11, embedded in rotating seal ring 2. Electromagnets 9, 9' cooperate with opposite magnetizable bodies 10 to vary the width of sealing gap 1.

Electromagnets 9, 9' are disposed in seal housing 4 to produce their effect in the axial direction, oppositely toward each other, against magnetizable bodies 10 which are carried on a shoulder portion 5a of non-rotating seal ring 5 and are designed as metal-sheet laminations. Electromagnetic forces are thus superimposed upon the forces exerted on non-rotating seal ring 5 by the sealing fluid and by movable packing element 3. These superimposed forces are controlled through sensors 8 independently of other forces which may act on the shaft maintain a predetermined sealing gap 1.

To establish equilibrium between the magnetic force applied to the rotating seal ring 5 over the magnetizable or magnetically attractable material bodies 10, a control device 22 is provided and connected to the sensor or sensors 8 as well as the electromagnets 9,9'. The control device 22 operates in known fashion as does the gap with sensors 8 to apply current over an appropriately supplied power supply, to one or both of the electromagnets 9 and 9'. That is if the gap is sensed to increase, attractive power is applied to electromagnet 9 to pull the non-rotating seal ring axially toward the rotating seal ring. Conversely if the gap is sensed to become smaller than a selected desired gap width, power is applied to electomagnet 9'. It is noted that magnetic force must cooperate with the fluid force supplied over conduit 4 and the resetting force of the bellows or packing element 3. As indicated by arrow 26, the packing element 3 is advantageously provided to bias the non-rotating seal ring 5 axially away from the rotating seal ring 2. This is to avoid a brushing contact between the relatively moving parts (a reduction of the gap width to zero) when power is lost in the control device 22 or pressure is lost in the fluid supply conduit 6.

According to the invention one or more temperature sensors 24 are also provided and connected to the control device 22 to regulate the gap width in dependency on the temperature in the gap. This is to compensate for expansion and contraction of the various parts that may affect the gap width and render it necessary to change the gap width to compensate for such expansion or contraction.

Since the foregoing manipulations are known to those in the art, additional details, in particular with regard to the control device are not here provided.

Figure 3:
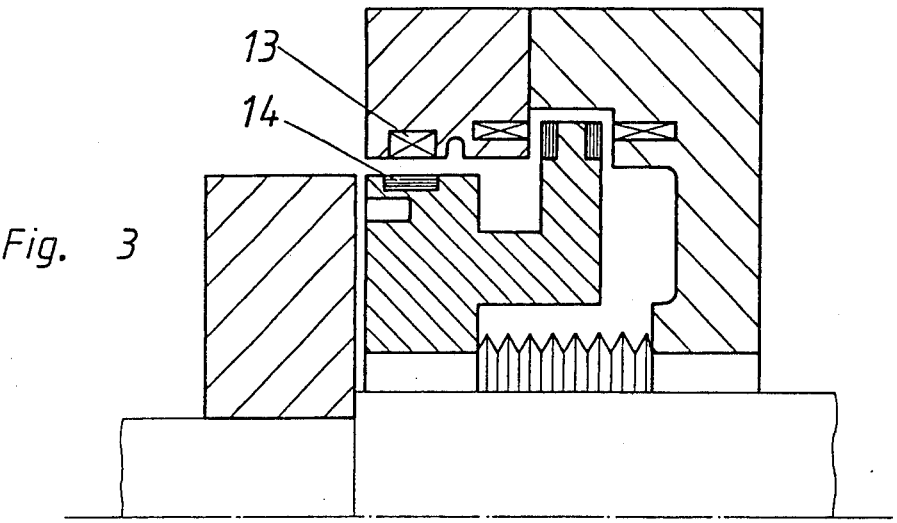
FIG. 3 is a view similar to FIG. 1 showing a radial guidance of the non-rotating seal ring, effected by means of electromagnets.
Figure 4:
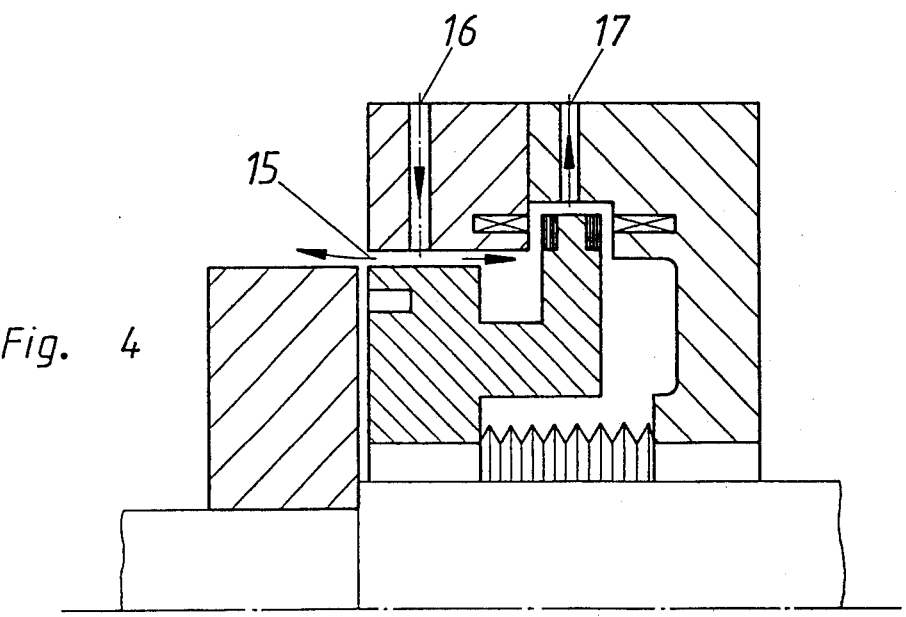
FIG. 4 is a view similar to FIG. 1 showing a radial guidance through a gas bearing.

To guide non-rotating seal ring 5 radially relative to seal housing 4, electromagnets 13 disposed in housing 4, and radially opposite metal-sheet laminations 14 carried on non-rotating seal ring 5 are provided, as shown in FIG. 3. Such a guidance may also be designed in accordance with FIG. 4, namely as a radial gas bearing 15, comprising a gas supply conduit 16 and a gas discharge conduit 17.

Figure 5:
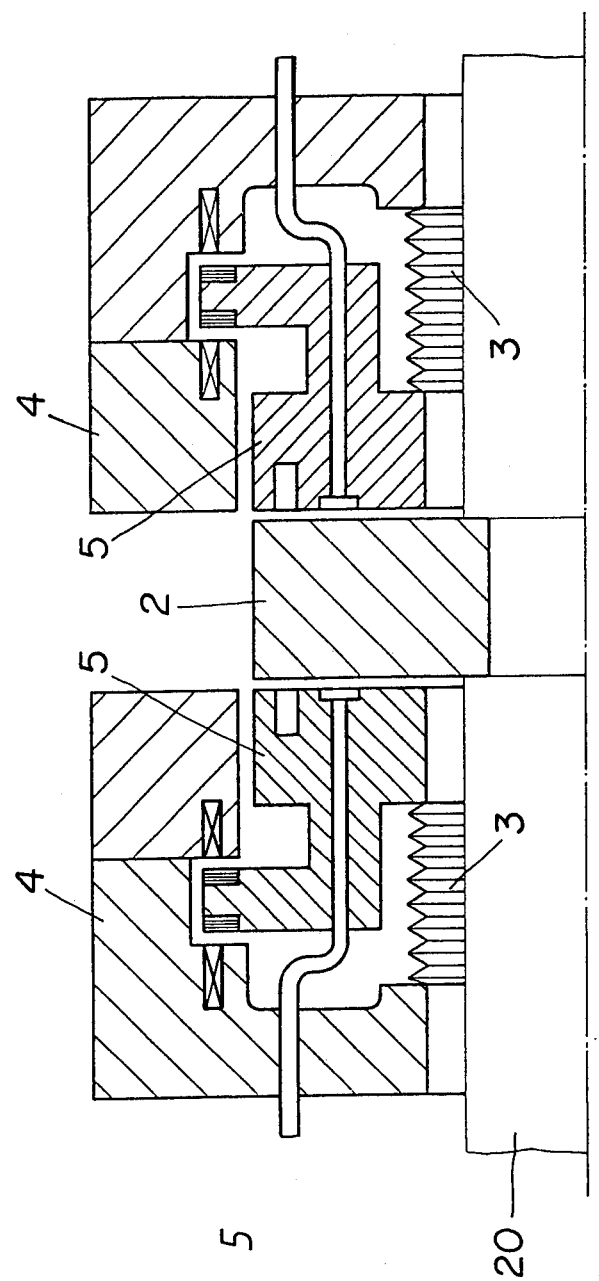
FIG. 5 is a sectional view showing a double shaft seal.

FIG. 5 shows the inventive sealing system of FIG. 1 embedded as a so-called double seal.

While specific embodiments of the invention have been shown and described in detail to illustrate the application of the principles of the invention, it will be understood that the invention may be embodied otherwise without departing from such principles.

What is claimed is:

1. A seal device for a shaft rotating with respect to a housing, comprising:

a rotating seal ring connected to and co-rotating with the shaft;

a non-rotating seal ring non-rotatably associated with the housing and defining a radial plane sealing gap with said rotating seal ring;

a packing element which is elastically yieldable in all directions, connected between the housing and said non-rotating seal ring for permitting relative motion therebetween to vary a width of the gap and exert a resetting force on said non-rotating seal ring;

sealing fluid means for supplying a sealing fluid to said gap under a supply pressure for exerting a fluid force between said rotating and non-rotating seal rings, said sealing fluid means supplying sealing fluid over at least one supply bore communicating with said gap;

said non-rotating seal ring having a radially extending shoulder with magnetically attractable material connected thereto, the housing having an annular recess for receiving said shoulder;

an electromagnet connected to the housing on each axial side of said shoulder and adjacent said recess for exerting a magnetic force on said shoulder through said magnetically attractable material;

at least one sensor connected to said non-rotating seal ring for sensing a width of said gap; and control means connected to said at least one sensor and each said electromagnets for activating at least one of said electromagnets in response to said at least one sensor for applying a selected magnetic force to act in conjunction with said fluid force and aid resetting force to maintain a selected width for said gap.

2. A device according to claim 1, wherein at least one of said rotating and non-rotating seal rings include a distributing pocket therein facing said gap, said at least one supply bore opening into said pocket.

3. A device according to claim 1, including a plurality of electromagnets connected to the housing on each side of said shoulder and each connected to said control means for establishing a redundant application of magnetic force to said shoulder.

4. A device according to claim 1, wherein said packing element exerts a resetting force on said non-rotating seal ring in a direction to widen said radial plane gap, so that with failure of at least one of said sealing fluid means and said control means, said non-rotating seal ring is pulled away from said rotating seal ring.

5. A device according to claim 1, wherein said non-rotating seal ring defines an annular axial gap with the housing, said device including fluid bearing means connected to the housing and applying at least of aerostatic and hydrostatic force against said non-rotating seal ring to maintain said annular gap around said non-rotating seal ring.

6. A device according to claim 1, wherein said non-rotating seal ring defines an annular axially extending gap with the housing, said device including an additional electromagnet connected to one of the housing and said non-rotating seal ring with additional magnetically attractable material in the other of the housing and said non-rotating seal ring associated with said additional electromagnet for maintaining said annular gap around said non-rotating seal ring.

7. A device according to claim 1, including a second non-rotating seal ring connected to said housing having a second shoulder and extending into a second annular recess in said housing, said second non-rotating seal ring defining a second radial plane gap with said rotating seal ring, additional electromagnets connected to said housing on either side of said additional recess for applying a magnetic force to said additional shoulder, said sealing fluid means connected to supply sealing fluid to said additional gap and an additional packing element connected between said additional non-rotating seal ring and said housing for exerting a resetting force on said additional non-rotating seal ring.

8. A device according to claim 1 including at least one temperature sensor connected to said non-rotating seal ring adjacent said gap for sensing a temperature in said gap, said temperature sensor connected to said control means for regulating said magnetic force in dependency on temperature in said gap to regulate said selected gap width.

9. A device according to claim 8, including at least three temperature sensors distributed around said gap and connected to said non-rotating seal ring.

10. In a shaft seal having a radial plane sealing gap, a seal ring rotating with the shaft, and a non-rotating seal ring mounted on a seal housing of the seal through an element which is elastically yielding in every direction and serves as a packing for the shaft, with sealing fluid flowing into the sealing gap through supply bores and through associated distributing pockets which are provided in at least one of the non-rotating seal ring and the rotating seal ring, and with electromagnets which are electronically controlled through sensors to adjust the width of the sealing gap, the improvement comprising: the electromagnets mounted in the seal housing axially at both sides of a shoulder portion projecting from the non-rotating seal ring, in positions to be effective against each other; the magnetic forces of the electromagnets which are controlled by the sensors provided in the sealing surface of the non-rotating seal ring being superimposed on fluidic forces acting axially on the non-rotating seal ring and on resetting forces of the elastically yielding packing element to maintain a predetermined sealing gap.

11. A method of maintaining a selected width in a radial plane gap between a rotating seal ring connected to and co-rotating with a shaft and a non-rotating seal ring non-rotatably associated with a housing, comprising:

providing an elastic yielding packing element to connect the non-rotating seal ring to the housing for applying a resetting force to the non-rotating seal ring in a direction to increase a width of the gap;

supplying a sealing fluid under pressure to the gap for exerting a fluid force between the rotating and non-rotating seal rings;

sensing the width of the gap; and magnetically attracting one axial side of the non-rotating seal ring in an amount and in a direction corresponding to a deviation of the gap width from a selected gap width as sensed by the sensor to maintain the selected gap width, the magnetic force being selected to cooperate with the fluid force and resetting force to maintain a selected gap width.

12. A method according to claim 11, including sensing a temperature in the gap and changing the selected gap width in accordance with the temperature to compensate for expansion or contraction of the shaft, the housing, the packing element, the rotating and the non-rotating seal rings.

* * * * *